(12) United States Patent
Atsumi

(10) Patent No.: US 9,716,786 B2
(45) Date of Patent: *Jul. 25, 2017

(54) MOBILE COMMUNICATION TERMINAL

(71) Applicant: KYOCERA Corporation, Kyoto-shi, Kyoto (JP)

(72) Inventor: Yoshihiko Atsumi, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,418

(22) Filed: Mar. 21, 2016

(65) Prior Publication Data

US 2016/0205241 A1 Jul. 14, 2016

Related U.S. Application Data

(63) Continuation of application No. 14/715,414, filed on May 18, 2015, now Pat. No. 9,326,247, which is a (Continued)

(30) Foreign Application Priority Data

Mar. 7, 2008 (JP) ................................. 2008-057191

(51) Int. Cl.
*H04M 1/725* (2006.01)
*H04W 52/02* (2009.01)
(Continued)

(52) U.S. Cl.
CPC ...... *H04M 1/72597* (2013.01); *G06F 3/0227* (2013.01); *G06F 3/0416* (2013.01);
(Continued)

(58) Field of Classification Search
CPC ......... H04M 2250/12; H04M 2250/22; H04W 52/0254
See application file for complete search history.

(56) References Cited

U.S. PATENT DOCUMENTS 6,405,062 B1 * 6/2002 Izaki ................... G01R 31/362
320/132
6,518,957 B1 2/2003 Lehtinen et al.
(Continued)

FOREIGN PATENT DOCUMENTS

JP H10-112743 A 4/1998
JP 2001-111661 A 4/2001
(Continued)

OTHER PUBLICATIONS

Office Action dated Nov. 25, 2014 issued in counterpart Japanese Application No. 2014-078530.
(Continued)

*Primary Examiner* — Qun Shen
(74) *Attorney, Agent, or Firm* — Procopio Cory Hargreaves and Savitch LLP

(57) ABSTRACT

A mobile phone apparatus 10 includes a touch panel controlling IC 30. The touch panel controlling IC 30 controls electric power supplied from the electric power IC 14 on the basis of a received active signal or standby signal to set a touch panel input apparatus 32 to an active state or a standby state on the basis of the received active signal or standby signal. A processor 12 transmits to the touch panel controlling IC 30 the active signal or the standby signal in correspondence with a determined state of the mobile phone apparatus 10.

2 Claims, 10 Drawing Sheets

Related U.S. Application Data continuation of application No. 13/763,371, filed on Feb. 8, 2013, now Pat. No. 9,037,195, which is a continuation of application No. 12/920,901, filed as application No. PCT/JP2009/054594 on Mar. 4, 2009, now Pat. No. 8,483,779.

(51) Int. Cl.
  *H04M 1/60* (2006.01)
  *G06F 3/02* (2006.01)
  *G06F 3/041* (2006.01)

(52) U.S. Cl.
  CPC ..... *H04M 1/6058* (2013.01); *H04M 1/72563* (2013.01); *H04W 52/0254* (2013.01); *H04W 52/0267* (2013.01); *H04M 2250/12* (2013.01); *H04M 2250/22* (2013.01); *H04W 52/027* (2013.01); *Y02B 60/50* (2013.01); *Y10S 379/916* (2013.01)

(56) References Cited

U.S. PATENT DOCUMENTS

| | | | |
|---|---|---|---|
| 7,158,913 | B2 | 1/2007 | Park et al. |
| 7,480,870 | B2 | 1/2009 | Anzures et al. |
| 7,499,730 | B2 | 3/2009 | Nagata |
| 7,603,143 | B2 * | 10/2009 | Kang .................. H04M 1/0214 455/550.1 |
| 7,657,849 | B2 | 2/2010 | Chaudhri et al. |
| 7,975,242 | B2 * | 7/2011 | Forstall ................. G06F 3/0488 715/773 |
| 7,986,978 | B2 * | 7/2011 | Katoh ................. H04M 1/6075 379/211.01 |
| 8,059,098 | B2 | 11/2011 | Huang et al. |
| 2003/0073430 | A1 | 4/2003 | Robertson et al. |
| 2004/0198464 | A1 * | 10/2004 | Panian ................. H04M 1/6066 455/569.1 |
| 2004/0204140 | A1 | 10/2004 | Nagata |
| 2005/0079896 | A1 | 4/2005 | Kokko et al. |
| 2006/0148526 | A1 | 7/2006 | Kamiya et al. |
| 2007/0061806 | A1 * | 3/2007 | Jeong ................. H04M 1/72522 718/100 |
| 2007/0281727 | A1 | 12/2007 | Bowen |
| 2008/0129703 | A1 * | 6/2008 | Takeshita .......... H04M 1/72519 345/173 |
| 2008/0224912 | A1 | 9/2008 | Wang |
| 2009/0106679 | A1 | 4/2009 | Anzures et al. |
| 2010/0144326 | A1 | 6/2010 | Wilhelmsson |

FOREIGN PATENT DOCUMENTS

| | | |
|---|---|---|
| JP | 2001-339504 A | 12/2001 |
| JP | 2001-527678 A | 12/2001 |
| JP | 2002-101193 A | 4/2002 |
| JP | 2003-008738 A | 1/2003 |
| JP | 2003-289349 A | 10/2003 |
| JP | 2004-159028 A | 6/2004 |
| JP | 2005-115428 A | 4/2005 |
| JP | 2005-278043 A | 10/2005 |
| JP | 2008-141687 A | 6/2006 |
| JP | 2006-279769 A | 10/2006 |
| JP | 2007-074716 A | 3/2007 |
| JP | 2009-211451 A | 9/2009 |
| JP | 2009-218647 A | 9/2009 |
| KR | 10-2006-0034527 A | 4/2006 |
| KR | 10-2006-0068245 A | 6/2006 |
| KR | 10-2007-0032176 A | 3/2007 |
| WO | 98/53389 A1 | 11/1998 |

OTHER PUBLICATIONS

Office Action dated Oct. 8, 2013, issued in a divisional application No. 2013-027241 issued in counterpart Japanese Application No. 2010-180144.

Notice of Grounds for Rejection dated Jan. 9, 2012, issued in counterpart Korean Application No. 10-2010-7019863.

International Preliminary Report on Patentability issued for International Application No. PCT/2009/054594.

Notice of Reasons for Rejection dated Oct. 30, 2012, issued in counterpart Japanese Application No. 2010-180144.

Office Action dated Jun. 23, 2015 issued in counterpart Japanese Application 2014-078530.

Office Action dated May 23, 2017 issued in counterpart Japanese Application No. 2016-118534.

* cited by examiner

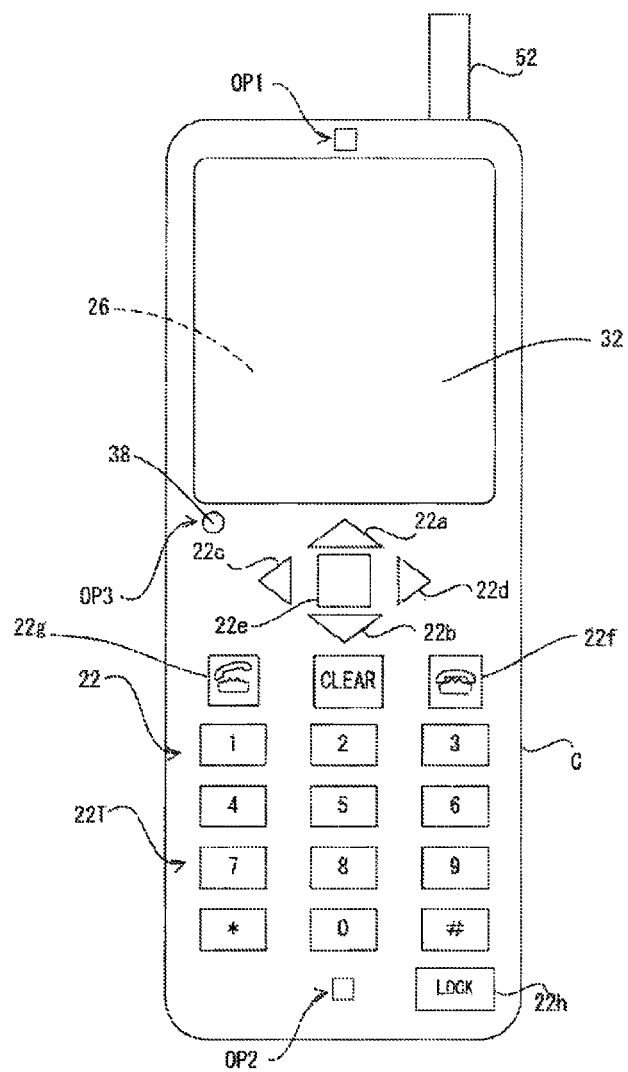

FIG. 3

| STATE | TOUCH PANEL |
|---|---|
| FIRST | ACTIVE (○) |
| SECOND | STANDBY (×) |

FIG. 4

| LOW-BATTERY | | SECOND (STANDBY (×)) |
|---|---|---|
| LCD NON-DISPLAY | | SECOND (STANDBY (×)) |
| TOUCH PANEL IS LOCKED | | SECOND (STANDBY (×)) |
| PHONE CALL IS IN PROGRESS | | |
| | ONLY PHONE CALL (THERE IS NO POSSIBILITY OF FUNCTION OPERATION) | SECOND (STANDBY (×)) |
| | INSERT OF EARPHONE JACK, HANDSFREE, HOLDING (THERE IS POSSIBILITY OF FUNCTION OPERATION) | FIRST (ACTIVE (○)) |
| APPLICATION IS BEING ACTIVATED | | |
| | TOUCH INPUT-COMPATIBLE | FIRST (ACTIVE (○)) |
| | TOUCH INPUT-NOT-COMPATIBLE | SECOND (STANDBY (×)) |
| OTHER STATE | | FIRST (ACTIVE (○)) |

FIG. 6

| STATE | TOUCH PANEL | ACCELERATION SENSOR |
|---|---|---|
| FIRST | ACTIVE(○) | ACTIVE(○) |
| SECOND | ACTIVE(○) | STANDBY(×) |
| THIRD | STANDBY(×) | ACTIVE(○) |
| FOURTH | STANDBY(×) | STANDBY(×) |

FIG. 7

| | |
|---|---|
| LOW-BATTERY | FOURTH(× ×) |
| LCD NON-DISPLAY | FOURTH(× ×) |
| TOUCH PANEL IS LOCKED | THIRD (× ○) |
| PHONE CALL IS IN PROGRESS | |
|    ONLY PHONE CALL (THREE IS NO POSSIBILITY OF FUNCTION OPERATION) | FOURTH(× ×) |
|    INSERT OF EARPHONE JACK, HANDSFREE, HOLDING (THERE IS POSSIBILITY OF FUNCTION OPERATION) | SECOND(○ ×) |
| APPLICATION IS BEING ACTIVATED | |
|    TOUCH INPUT-COMPATIBLE, ROTATIVE DISPLAY-COMPATIBLE | FIRST(○○) |
|    TOUCH INPUT-COMPATIBLE, ROTATIVE DISPLAY-NOT-COMPATIBLE | SECOND(○ ×) |
|    TOUCH INPUT-NOT-COMPATIBLE, ROTATIVE DISPLAY-COMPATIBLE | THIRD (× ○) |
|    TOUCH INPUT-NOT-COMPATIBLE, ROTATIVE DISPLAY-NOT-COMPATIBLE | FOURTH(× ×) |
| OTHER STATE | FIRST(○○) |

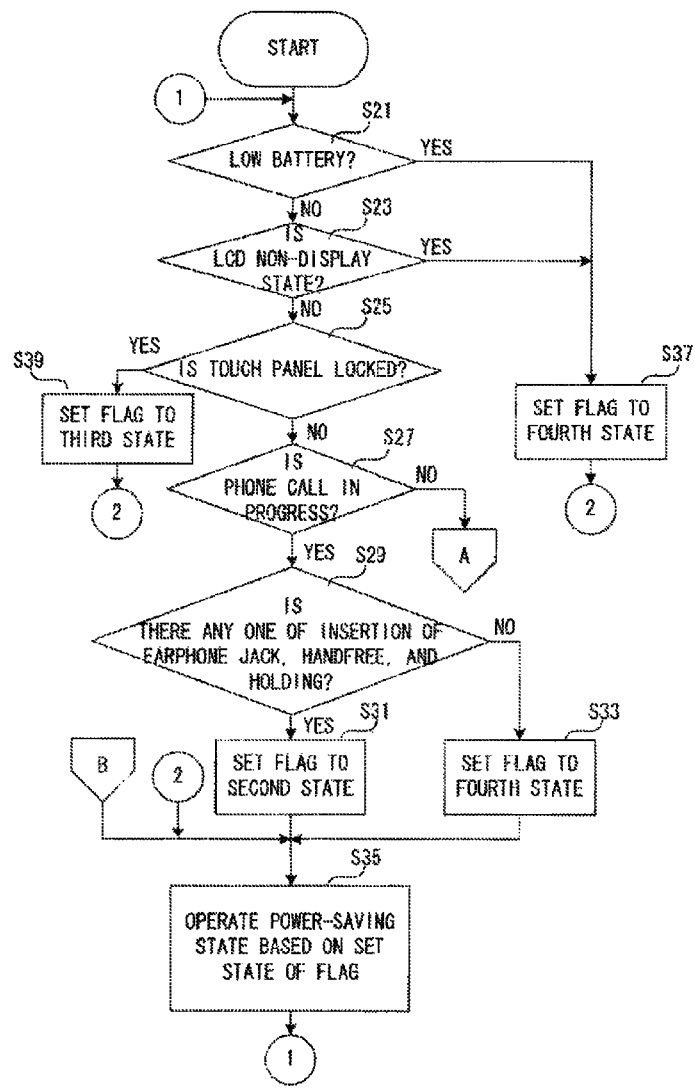

FIG. 10

| STATE | TOUCH PANEL | ACCELERATION SENSOR | PHOTOSENSOR |
|---|---|---|---|
| FIRST | ACTIVE(○) | ACTIVE(○) | ON(○) |
| SECOND | ACTIVE(○) | STANDBY(×) | ON(○) |
| THIRD | ACTIVE(○) | STANDBY(×) | OFF(×) |
| FOURTH | STANDBY(×) | ACTIVE(○) | ON(○) |
| FIFTH | STANDBY(×) | STANDBY(×) | ON(○) |
| SIXTH | STANDBY(×) | STANDBY(×) | OFF(×) |

FIG. 11

| | | |
|---|---|---|
| LOW-BATTERY | | SIXTH(× × ×) |
| LCD NON-DISPLAY | | SIXTH(× × ×) |
| TOUCH PANEL IS LOCKED | | FOURTH(×○○) |
| PHONE CALL IS IN PROGRESS | | |
| | ONLY PHONE CALL (THERE IS NO POSSIBILITY OF FUNCTION OPERATION) | SIXTH(× × ×) |
| | INSERT OF EARPHONE JACK, HANDSFREE, HOLDING (THERE IS POSSIBILITY OF FUNCTION OPERATION) | |
| | THERE IS FUNCTION OPERATION | SECOND(○×○) |
| | THERE IS NO FUNCTION OPERATION | THIRD(○××) |
| APPLICATION IS BEING ACTIVATED | | |
| | TOUCH INPUT-COMPATIBLE, ROTATIVE DISPLAY-COMPATIBLE | FIRST(○○○) |
| | TOUCH INPUT-COMPATIBLE, ROTATIVE DISPLAY-NOT-COMPATIBLE | SECOND(○×○) |
| | TOUCH INPUT-NOT-COMPATIBLE, ROTATIVE DISPLAY-COMPATIBLE | FOURTH(×○○) |
| | TOUCH INPUT-NOT-COMPATIBLE, ROTATIVE DISPLAY-NOT-COMPATIBLE | FIFTH ××○ |
| OTHER STATE | | FIRST ○○○ |

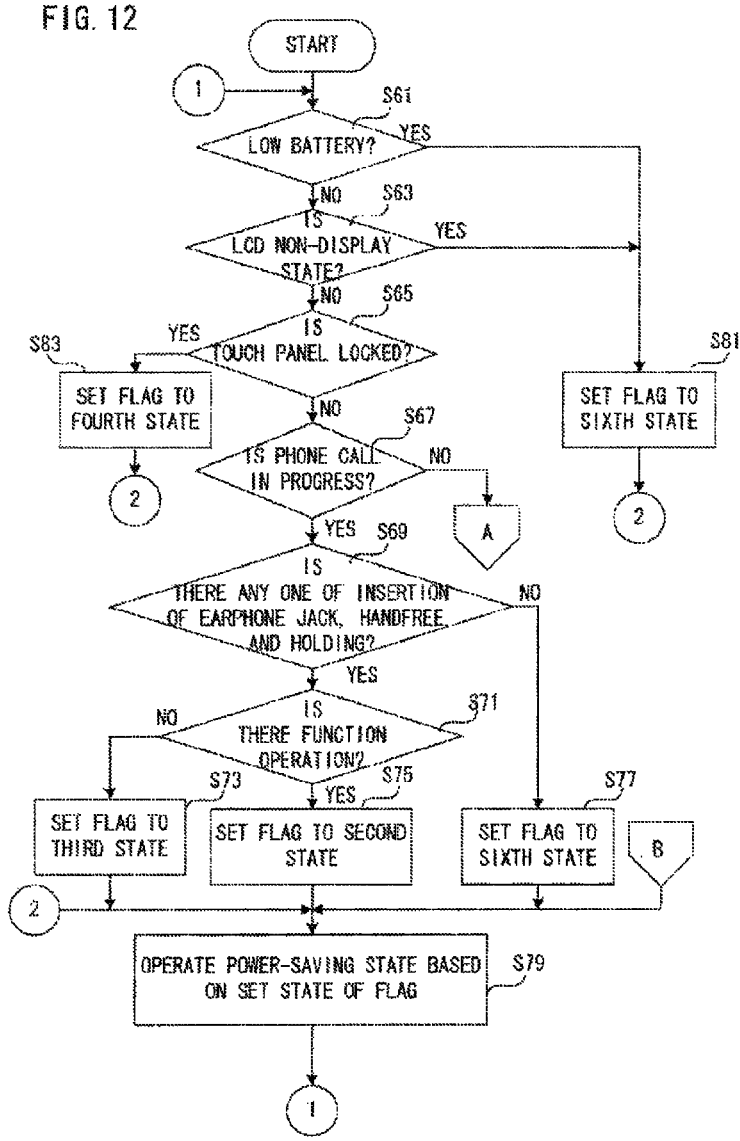

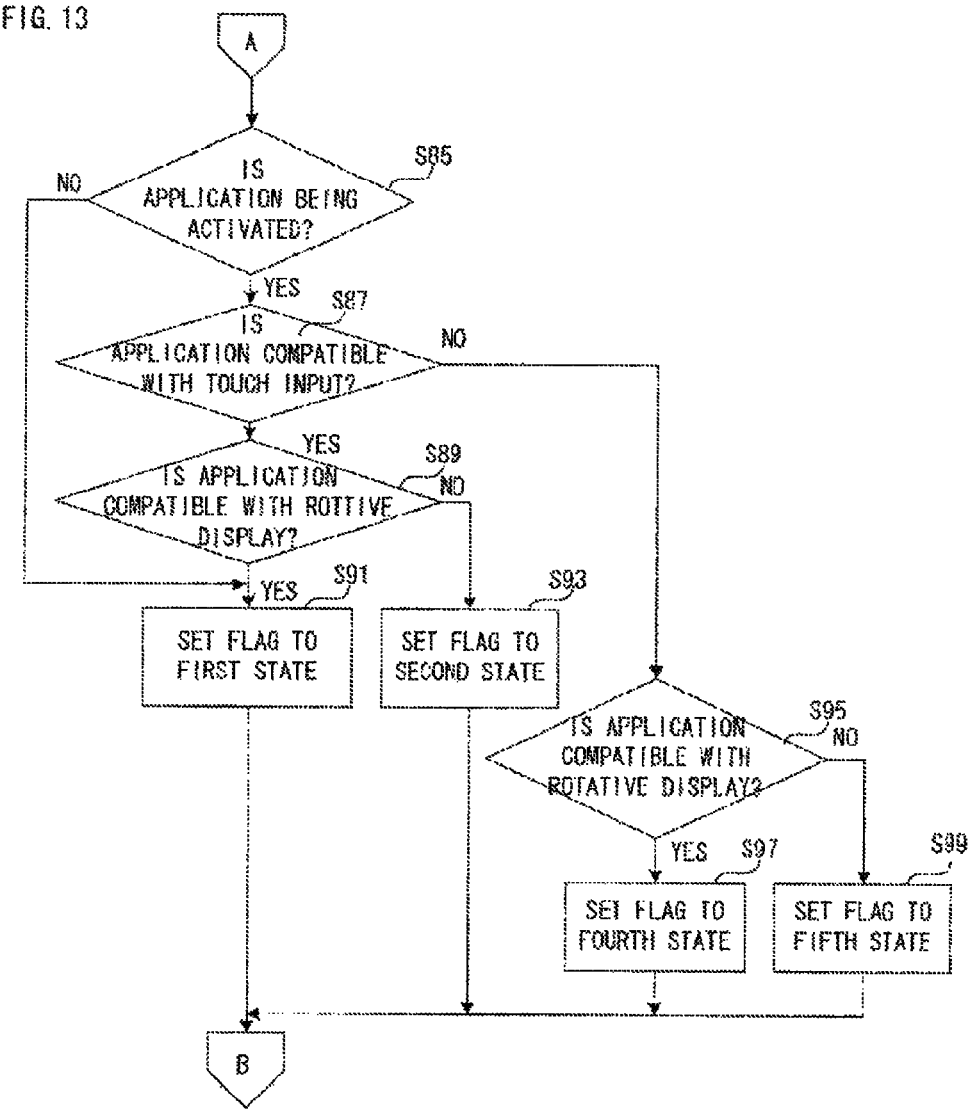

MOBILE COMMUNICATION TERMINAL

CROSS-REFERENCING

This application is a continuation of U.S. application Ser. No. 14/715,414 filed on May 18, 2015, which is a continuation of U.S. application Ser. No. 13/763,371 filed on Feb. 8, 2013, which is a continuation of U.S. application Ser. No. 12/920,901 filed on Sep. 3, 2010, which is a National Stage of International Application number PCT/JP2009/054594 filed on Mar. 4, 2009, which claims the benefit of Japanese Application number 2008-057191 filed on Mar. 7, 2008. The contents of each of the above applications are incorporated herein by reference in their entirety.

TECHNICAL FIELD

The present invention relates to a mobile communication terminal. More specifically, the present invention relates to a mobile communication terminal having external sensors, such as a touch panel, an acceleration sensor, a photosensor, etc.

BACKGROUND ART

An example of a flip mobile-phone of this kind has a touch panel that allows a user to perform a sensory input operation by tapping with a finger, a touch pen, etc. and a direction sensor for detecting a relationship between the up and down directions of a first casing and a second casing that are folded with each other, as external sensors. Furthermore, generally prevalent mobile phone apparatuses have a photosensor, etc. for detecting an amount of light outside in order to adjust brightness of a backlight of a liquid crystal display device.

However, in such a mobile phone apparatus and today's mobile phone apparatuses, since a plurality of external sensors are provided, more electric power is required to maintain the operations of the external sensors, so that there is a problem of speeding up consumption of the limited electric power of the battery.

SUMMARY OF THE INVENTION

Therefore, it is a primary object of the present invention to provide a novel mobile communication terminal.

Another object of the present invention is to provide a mobile communication terminal capable of reducing electric power consumption of a battery by conserving electric power of external sensors.

The present invention employs following features in order to solve the above-described problems. It should be noted that reference numerals and the supplements inside the parentheses show one example of a corresponding relationship with the embodiments described later for easy understanding of the present invention, and do not limit the present invention.

A first invention is a mobile communication terminal comprising: a display device; a touch panel which is arranged on a top surface of the display device; a power supply portion which supplies an electric power of a predetermined voltage from a battery; a controller which outputs an active signal which sets the touch panel to an active state or a standby signal which sets the touch panel to a standby state by determining a condition; and a touch panel controller which controls the electric power supplied from the power supply portion on the basis of the active signal or the standby signal to set the touch panel to the active state or the standby state, wherein the controller determines a first condition (condition 1) in a case that a phone call is in progress, and there is no possibility that a function operation other than a phone call is performed, determines a second condition (condition 2) in a case that a phone call is in progress, but there is a possibility that a function operation other than a phone call is performed, outputs the standby signal in a case that the first condition (condition 1) is determined, and outputs the active signal in a case that the second condition (condition 2) is determined.

In the first invention, a controller (12) determines a first condition (condition 1) in a case that a phone call is in progress and there is no possibility that a function operation other than a phone call is performed, and outputs a standby signal to a touch panel controller (30) in this case. Furthermore, the controller determines the second condition (condition 2) in a case that a phone call is in progress, but there is a possibility that a function operation other than a phone call is performed, and outputs an active signal to the touch panel controller in this case. When receiving the active signal from the controller, the touch panel controller controls the electric power supplied from a power supply portion (14) to set the touch panel (32) to the active state, and when receiving the standby signal, the touch panel controller controls the electric power supplied from a power supply portion (14) to set the touch panel to the standby state.

According to the first invention, the state of the mobile communication terminal is determined, and if an operation of the touch panel is required in each of the determined states, the touch panel is set to the active state, and if an operation is not required, the touch panel is set to the standby state, so that it is possible to reduce the electric power consumption.

A second invention is an invention according to the first invention, wherein the controller determines a third condition (condition 3) in a case that a phone call is not in progress and an application which is being activated is compatible with a touch input, determines a fourth condition (condition 4) in a case that a phone call is not in progress, and an application which is being activated is not compatible with a touch input, outputs the active signal in a case that the third condition (condition 3) is determined, and outputs the standby signal in a case that the fourth condition (condition 4) is determined.

In the second invention, a controller (12) determines a third condition (condition 3) in a case that a phone call is not in progress and an application which is being activated is compatible with a touch input, and outputs the active signal to a touch panel controller (30) in this case. Furthermore, the controller determines a fourth condition (condition 4) in a case that a phone call is not in progress, and an application which is being activated is not compatible with a touch input, and outputs the standby signal to the touch panel controller in this case.

According to the second invention, the state of the mobile communication terminal is determined, and if an operation of the touch panel is required in each of the determined states, the touch panel is set to the active state, and if an operation is not required, the touch panel is set to the standby state, so that it is possible to reduce the electric power consumption.

A third invention is a mobile communication terminal, comprising: a display device; a touch panel which is arranged on a top surface of the display device; an acceleration sensor which detects an inclination of the display device; a power supply portion which supplies an electric power of a predetermined voltage from a power source; a controller which outputs an active signal which sets the touch panel and the acceleration sensor to an active state or a standby signal which sets the touch panel and the acceleration sensor to a standby state by determining a condition; a touch panel controller which controls the electric power supplied from the power supply portion on the basis of the active signal or the standby signal to set the touch panel to the active state or the standby state; an acceleration sensor controller which controls the electric power supplied from the power supply portion on the basis of the active signal or the standby signal to set the acceleration sensor to the active state or the standby state; and the controller determines a fifth condition (condition 5) in a case that a phone call is in progress, and there is no possibility that a function operation other than a phone call is performed, determines a sixth condition (condition 6) in a case that a phone call is in progress, but there is a possibility that a function operation other than a phone call is performed, outputs the standby signal to the touch panel controller and the acceleration sensor controller in a case that the fifth condition (condition 5) is determined, and outputs the active signal to the touch panel controller and outputs the standby signal to the acceleration sensor controller in a case that the sixth condition (condition 6) is determined.

In the third invention, a controller (12) determines a fifth condition (condition 5) in a case that a phone call is in progress, and there is no possibility that a function operation other than a phone call is performed, and outputs the standby signal to a touch panel controller (30) and an acceleration sensor controller (34) in this case. Furthermore, the controller determines a sixth condition (condition 6) in a case that a phone call is in progress, but there is a possibility that a function operation other than a phone call is performed, and outputs the active signal to the touch panel controller and outputs the standby signal to the acceleration sensor controller in this case. Then, when receiving the active signal from the controller, the touch panel controller controls the electric power supplied from a power supply portion (14) to set a touch panel (32) to the active state, and when receiving the standby signal, the touch panel controller controls the electric power supplied from the power supply portion to set the touch panel to the standby state. Furthermore, when receiving the active signal from the controller, the acceleration sensor controller controls the electric power supplied from the power supply portion to set the acceleration sensor to the active state, and when receiving the standby signal, the acceleration sensor controller controls the electric power supplied from the power supply portion to set the acceleration sensor to the standby state.

According to the third invention, the state of the mobile communication terminal is determined, and if operations of the touch panel and the acceleration sensor are required in each of the determined states, the touch panel and the acceleration sensor are set to the active state, and if operations are not required, the touch panel and the acceleration sensor are set to the standby state, so that it is possible to reduce the electric power consumption.

A fourth invention is an invention according to the third invention, wherein the controller determines a seventh condition (condition 7) in a case that a phone call is not in progress, and an application which is being activated is compatible with a touch input and a rotative display, determines an eighth condition (condition 8) in a case that a phone call is not in progress, and the application which is being activated is compatible with the touch input and is not compatible with the rotative display, determines a ninth condition (condition 9) in a case that a phone call is not in progress, and the application which is being activated is not compatible with the touch input and is compatible with the rotative display, determines a tenth condition (condition 10) in a case that a phone call is not in progress, and the application which is being activated is not compatible with the touch input and the rotative display, outputs the standby signal to the touch panel controller and the acceleration sensor controller in a case that the tenth condition (condition 10) is determined, outputs the active signal to the touch panel controller and outputs the standby signal to the acceleration sensor controller in a case that the eighth condition (condition 8) is determined, outputs the active signal to the touch panel controller and the acceleration sensor controller in a case that the seventh condition (condition 7) is determined, and outputs the standby signal to the touch panel controller and outputs the active signal to the acceleration sensor controller in a case that the ninth condition (condition 9) is determined.

In the fourth invention, a controller (12) determines a seventh condition (condition 7) in a case that a phone call is not in progress, and an application which is being activated is compatible with a touch input and a rotative display, and outputs the active signal to a touch panel controller (30) and an acceleration sensor controller (34) in this case. In addition, the controller determines an eighth condition (condition 8) in a case that a phone call is not in progress, and the application which is being activated is compatible with the touch input and is not compatible with the rotative display, and outputs the active signal to the touch panel controller and outputs the standby signal to the acceleration sensor controller in this case. In addition, the controller determines a ninth condition (condition 9) in a case that a phone call is not in progress, and the application which is being activated is not compatible with the touch input and is compatible with the rotative display, and outputs the standby signal to the touch panel controller and outputs the active signal to the acceleration sensor controller in this case. In addition, the controller determines a tenth condition (condition 10) in a case that a phone call is not in progress, and the application which is being activated is not compatible with the touch input and the rotative display, and outputs the standby signal to the touch panel controller and the acceleration sensor controller in this case.

According to the fourth invention, the state of the mobile communication terminal is determined, and if operations of the touch panel and the acceleration sensor are required in each of the determined states, the touch panel and the acceleration sensor are set to the active state, and if operations are not required, the touch panel and the acceleration sensor are set to the standby state, so that it is possible to the reduce electric power consumption.

A fifth invention is a mobile communication terminal, comprising: a display device; a touch panel which is arranged on a top surface of the display device; an acceleration sensor which detects an inclination of the display device; a photosensor which detects an amount of light outside in order to adjust brightness of the display device; a power supply portion which supplies an electric power of a predetermined voltage from a power source; a controller which outputs an active signal which sets the touch panel and the acceleration sensor to an active state or a standby signal which sets the touch panel and the acceleration sensor to a standby state, and switches the electric power from the power supply portion to the photosensor between a power-supply and a power-shut-down by determining a condition; a touch panel controller which controls the electric power supplied from the power supply portion on the basis of the active signal or the standby signal to set the touch panel to the active state or the standby state; an acceleration sensor controller which controls the electric power supplied from the power supply portion on the basis of the active signal or the standby signal to set the acceleration sensor to the active state or the standby state; and the controller determines a eleventh condition (condition 11) in a case that a phone call is in progress, and there is no possibility that a function operation other than a phone call is performed, determines a twelfth condition (condition 12) in a case that a phone call is in progress, and there is a possibility that a function operation other than a phone call is performed and a function operation is performed, determines a thirteenth condition (condition 13) in a case that a phone call is in progress, and there is a possibility that a function operation other than a phone call is performed and a function operation is not performed, outputs the standby signal to the touch panel controller and the acceleration sensor controller and shuts down the electric power to the photosensor in a case that the eleventh condition (condition 11) is determined, outputs the active signal to the touch panel controller, outputs the standby signal to the acceleration sensor controller, and supplies the electric power to the photosensor in a case that the twelfth condition (condition 12) is determined, and outputs the active signal to the touch panel controller, outputs the standby signal to the acceleration sensor controller, and shuts off the electric power to the photosensor in a case that the thirteenth condition (condition 13) is determined.

In the fifth invention, a controller (12) determines a eleventh condition (condition 11) in a case that a phone call is in progress, and there is no possibility that a function operation other than a phone call is performed, and outputs the standby signal to a touch panel controller (30) and an acceleration sensor controller (34), and shuts down the electric power to a photosensor (38) in this case. Furthermore, the controller determines a twelfth condition (condition 12) in a case that a phone call is in progress, and there is a possibility that a function operation other than a phone call is performed and a function operation is performed, and outputs the active signal to the touch panel controller, outputs the standby signal to the acceleration sensor controller, and supplies the electric power to the photosensor in this case. Then, the controller determines a thirteenth condition (condition 13) in a case that a phone call is in progress, and there is a possibility that a function operation other than a phone call is performed and a function operation is not performed, outputs the active signal to the touch panel controller, outputs the standby signal to the acceleration sensor controller, and shuts off the electric power to the photosensor in this case. Then, when receiving the active signal from the controller, the touch panel controller controls the electric power supplied from a power supply portion (14) to set a touch panel (32) to the active state, and when receiving the standby signal, the touch panel controller controls the electric power supplied from the power supply portion to set the touch panel to the standby state. Furthermore, when receiving the active signal from the controller, the acceleration sensor controller controls the electric power supplied from the power supply portion to set an acceleration sensor (36) to the active state, and when receiving the standby signal, the acceleration sensor controller controls the electric power supplied from the power supply portion to set the acceleration sensor to the standby state.

According to the fifth invention, the state of the mobile communication terminal is determined, and if operations of the touch panel, the acceleration sensor, and the photosensor are required in each of the determined states, the touch panel and the acceleration sensor are set to the active state, and an electric power to the photosensor is supplied. If operations are not required, the touch panel and the acceleration sensor are set to the standby state, and the electric power to the photosensor is shut down, so that it is possible to reduce the electric power consumption.

A sixth invention is an invention according to the fifth invention, wherein the controller determines a fourteenth condition (condition 14) in a case that a phone call is not in progress, and an application which is being activated is compatible with a touch input and a rotative display, determines a fifteenth condition (condition 15) in a case that a phone call is not in progress, and the application which is being activated is compatible with the touch input and is not compatible with the rotative display, determines a sixteenth condition (condition 16) in a case that a phone call is not in progress, and the application which is being activated is not compatible with the touch input and is compatible with the rotative display, determines a seventeenth condition (condition 17) in a case that a phone call is not in progress, and the application which is being activated is not compatible with the touch input and the rotative display, outputs the active signal to the touch panel controller and the acceleration sensor controller, and supplies the electric power to the photosensor in a case that the fourteenth condition (condition 14) is determined, outputs the active signal to the touch panel controller, outputs the standby signal to the acceleration sensor controller, and supplies the electric power to the photosensor in a case that the fifteenth condition (condition 15) is determined, outputs the standby signal to the touch panel controller, outputs the active signal to the acceleration sensor controller, and supplies the electric power to the photosensor in a case that the sixteenth condition (condition 16) is determined, and outputs the standby signal to the touch panel controller and the acceleration sensor controller and supplies the electric power to the photosensor in a case that the seventeenth condition (condition 17) is determined.

In the sixth invention, a controller (12) determines a fourteenth condition (condition 14) in a case that a phone call is not in progress, and an application which is being activated is compatible with a touch input and a rotative display, and outputs the active signal to a touch panel controller (30) and an acceleration sensor controller (34), and supplies the electric power to a photosensor (38) in this case. Furthermore, the controller determines a fifteenth condition (condition 15) in a case that a phone call is not in progress, and the application which is being activated is compatible with the touch input and is not compatible with the rotative display, and outputs the active signal to the touch panel controller, outputs the standby signal to the acceleration sensor controller, and supplies the electric power to the photosensor in this case. In addition, the controller determines a sixteenth condition (condition 16) in a case that a phone call is not in progress, and the application which is being activated is not compatible with the touch input and is compatible with the rotative display, and outputs the standby signal to the touch panel controller, outputs the active signal to the acceleration sensor controller, and supplies the electric power to the photosensor in this case. Then, the controller determines a seventeenth condition (condition 17) in a case that a phone call is not in progress, and the application which is being activated is not compatible with the touch input and the rotative display, and outputs the standby signal to the touch panel controller and the acceleration sensor controller and supplies the electric power to the photosensor in this case.

According to the sixth invention, the state of the mobile communication terminal is determined, and if operations of the touch panel, the acceleration sensor, and the photosensor are required in each of the determined states, the touch panel and the acceleration sensor are set to the active state, and an electric power to the photosensor is supplied, if operations are not required, the touch panel and the acceleration sensor are set to the standby state, and the electric power to the photosensor is shut down, so that it is possible to reduce the electric power consumption.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a front view showing a schematic diagram of the mobile phone apparatus 10 as one embodiment of the first invention.

FIG. 3 is an illustrative view showing a power-saving state of the mobile phone apparatus 10 as one embodiment of the first invention.

FIG. 4 is an illustrative view showing a relationship between a state of the mobile phone apparatus 10 and a power-saving state in the mobile phone apparatus 10 as one embodiment of the first invention.

FIG. 6 is an illustrative view showing a power-saving state of the mobile phone apparatus 10 as one embodiment of a second invention.

FIG. 7 is an illustrative view showing a relationship between a state of the mobile phone apparatus 10 and a power-saving state in the mobile phone apparatus 10 as one embodiment of the second invention.

FIG. 8 is a flowchart explaining processing when the processor 12 switches a touch panel 32 and the acceleration sensor 36 between an active state and a standby state in the mobile phone apparatus 10 as one embodiment of the second invention.

FIG. 10 is an illustrative view showing a power-saving state of the mobile phone apparatus 10 as one embodiment of a third invention.

FIG. 11 is an illustrative view showing a relationship between a state of the mobile phone apparatus 10 and a power-saving state in the mobile phone apparatus 10 of one embodiment of the third invention.

FIG. 12 is a flowchart explaining processing when the processor 12 switches the touch panel 32 and the acceleration sensor 36 between an active state and a standby state, and switches an electric power supply to a photosensor 38 between ON and OFF states in the mobile phone apparatus 10 as one embodiment of the third invention.

FIG. 13 is a flowchart sequel to the flowchart in FIG. 12.

BEST MODE FOR PRACTICING THE INVENTION

First Embodiment

Figure 1:
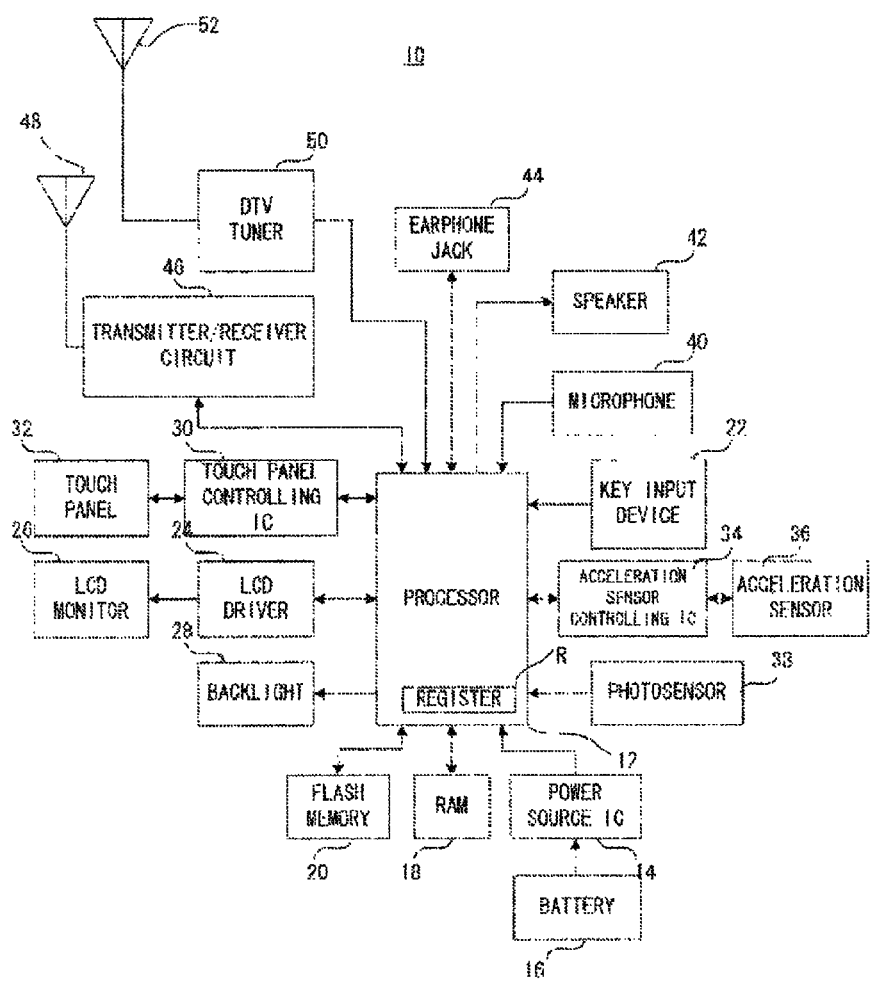
FIG. 1 is a block diagram showing a mobile phone apparatus 10 as one embodiment of a first invention.

Referring to FIG. 1, a mobile phone apparatus 10 as a mobile communication terminal includes a processor 12. As understood from FIG. 1, the processor 12 is connected with a power source IC 14, a RAM (Random Access Memory) 18, a flash memory 20, a key input device 22, an LCD (Liquid Crystal Display) driver 24, a backlight 28, a touch panel controlling IC 30, an acceleration sensor controlling IC 34, a photosensor 38, a microphone 40, a speaker 42, an earphone jack 44, a transmitter/receiver circuit 46, and a DTV (Digital Television) tuner 50.

The power source IC 14 functions as a power supply circuit for generating plurality kinds of voltages from a battery 16 as a power source, and supplying the generated voltages to each circuit of the mobile phone apparatus 10.

The RAM 18 is a storage device capable of being directly accessed from the processor 12, and being used as a temporary storage when information arithmetic processing of the processor 12 is performed.

The flash memory 20 is a storage device to and from which data can be freely written and read and having nonvolatility, and storing various programs to be executed by the processor 12 and various data to be executed in these programs.

The key input device 22 has a plurality of keys from a numeric keypad 22T (see FIG. 2), and allows a user to apply an instruction to the processor 12 and inputs a value with a push of each of the keys.

The LCD driver 24 controls an LCD monitor 26 connected to the LCD driver 24 to display characters and images on the LCD monitor 26 according to an instruction from the processor 12.

The backlight 28 is for illuminating the LCD monitor 26 from behind, and an edge light system, for example, is adopted therefor. The brightness of the backlight 28 can be adjusted in six levels, for example, by the processor 12.

The touch panel controlling IC 30 functions as a touch panel controlling circuit for controlling a touch panel 32 connected to the touch panel controlling IC 30. The touch panel 32 is arranged on a top surface of the LCD monitor 26, designates a position on the panel by detecting a position touched by a finger, etc., and applies an instruction according to the position on the panel to the processor 12. That is, by pushing, stroking, illustrating on the surface of the touch panel 32 with a finger, a pen or the like, it is possible to input a pushed position, a stroked direction, an illustrated graphics, etc. For sensing a touch on the panel, an electrostatic capacity coupling system to sense an electric signal by static electricity is adopted, but a resistance film system, an optical system (infrared rays system) may be adopted without being restricted to the electrostatic capacity coupling system.

Furthermore, when receiving an active signal from the processor 12, the touch panel controlling IC 30 supplies an electric power from the power source IC 14 to the touch panel 32 to thereby set the touch panel 32 to an active state. On the other hand, when receiving a standby signal from the processor 12, the touch panel controlling IC 30 shuts down the electric power from the power source IC 14 to the touch panel 32 to thereby set the touch panel 32 to a standby state. Furthermore, the touch panel controlling IC 30 shuts down an electric power supply to a part that is not used by the touch panel 32 in the standby-state out of its own circuit 30, and becomes the standby-state itself when the standby signal is received.

The acceleration sensor controlling IC 34 functions as an acceleration sensor controlling circuit for controlling an acceleration sensor 36 connected to the acceleration sensor controlling IC 34. The acceleration sensor controlling IC 34 and the acceleration sensor 36 are integrally formed by an MEMS (Micro Electro Mechanical Systems) technology. The acceleration sensor 36 is for detecting how much acceleration in a certain direction is exerted on the sensor, and is a two-axis acceleration sensor capable of detecting accelerations in a two-axis direction at a time, for example. According to the acceleration sensor 36, it is possible to detect how much the mobile phone apparatus 10 is inclined with respect to the ground. In a case that an image is displayed on the LCD monitor 26, the processor 12 can determine up and down directions of the mobile phone apparatus 10, that is, the LCD monitor 26 on the basis of the inclination detected by the acceleration sensor 36, and display the image in a rotated manner according to the determined up and down directions of the LCD monitor 26. Determining the up and down directions of the LCD monitor 26 and displaying a display object in a rotated manner is hereinafter referred to as a "rotative display".

The photosensor 38 is a sensor for detecting light, generates a current having magnitude corresponding to the brightness of the detected light, and converts the generated current to a voltage to output the same to the processor 12. The processor 12 adjusts the brightness of the backlight 28 for illuminating the LCD monitor 26 in correspondence with the outside brightness detected by the photosensor 38. That is, in a case that it is light outside, the backlight 28 is lit up bright, and in a case that it is dark outside, the backlight 28 is lit up with low brightness.

The microphone 40 captures a sound generated by the user to convert it to an electric signal, and outputs the electric signal to the processor 12. Furthermore, the speaker 42 is for converting the electric signal applied from the processor 12 to a sound and outputting the same. In addition, the earphone jack 44 is for being connected with a terminal of an earphone (not illustrated). When detecting the terminal of the earphone is inserted into the earphone jack 44, the processor 12 stops outputting the sound from the speaker 42, and outputs the sound from the speaker of the earphone. Furthermore, when detecting that a terminal of an earphone with microphone (not illustrated) is inserted into the earphone jack 44, in addition to stopping the sound output from the speaker 42, the processor 12 stops an input of the sound signal from the microphone 40, and accepts a sound signal from the microphone of the earphone with microphone.

The transmitter/receiver circuit 46 is a circuit for implementing a wireless communication in a CDMA (Code Division Multiple Access) system, for example. When a call-out operation is performed on the key input device 22, the processor 12 controls the transmitter/receiver circuit 46 to output a calling signal. The calling signal output from the transmitter/receiver circuit 46 is output from an antenna 48 to be transmitted to a phone apparatus of a communication partner through a mobile communication network including base stations. When a call-in operation is performed by the phone apparatus of the communication partner, a communication-capable state is established.

When a conversation end operation is performed on the key input device 22 after a transition to the communication-capable state, the processor 12 controls the transmitter/receiver circuit 46 to send a conversation end signal to the communication partner. After transmitting the conversation end signal, the processor 12 ends the conversation processing. In a case that a conversation end signal is first received from the communication partner as well, the processor 12 ends the conversation processing. Furthermore, in a case that a conversation end signal is received from the mobile communication network not from the communication partner as well, the processor 12 ends the conversation processing.

When a calling signal from the communication partner is captured by the antenna 48, the transmitter/receiver circuit 46 notifies an incoming call to the processor 12. The processor 12 outputs calling source information described in the incoming call notification to the LCD monitor 26, and outputs an incoming call tone from a incoming call notifying speaker not shown. When a call-in operation is performed on the key input device 22, a communication-capable state is established.

In the communication-capable state, following processing is executed. A modulated sound signal (high frequency signal) sent from the communication partner is received by the antenna 48. The received modulated sound signal undergoes demodulation processing and decode processing by the transmitter/receiver circuit 46. The reception sound signal obtained by such the processes is output from the speaker 42. A transmission sound signal captured by the microphone 40 undergoes encoding processing and modulation processing by the transmitter/receiver circuit 46. The modulated sound signal obtained by such the processes is transmitted to the communication partner via the antenna 48 as described above.

The DTV tuner 50 is for receiving a digital terrestrial television broadcast (One seg). When a channel selecting operation is performed on the key input device 22, the DTV tuner 50 extracts a digital terrestrial television broadcast signal corresponding to the selected channel from the digital terrestrial television broadcast signal received by a DTV antenna 52. Furthermore, the DTV tuner 50 performs digital demodulation, etc. on the extracted digital terrestrial television broadcast signal to thereby generate a demodulated signal. The generated demodulated signal is separated into a demodulated signal for video broadcasting and a demodulated signal for data broadcasting, and they are output to the processor 12. The processor 12 performs decode processing based on an MPEG (Moving Picture Experts Group) system on the demodulated signal for video broadcasting to generate a video signal. In addition, the processor 12 performs decode processing on the demodulated signal for data broadcasting to thereby form text data, etc. The video signal and text data thus formed are displayed on the LCD monitor 26 by an operation of the LCD driver 24.

FIG. 2 is an appearance view of the mobile phone apparatus 10. With reference to FIG. 2, the mobile phone apparatus 10 has a case C formed in a plate shape. On a side surface of one end of the case C in a longitudinal direction, the DTV antenna 52 is provided. Here, the antenna 48 for wireless communication is arranged inside the case C. On a lower top surface of the case C, the key input device 22 is arranged. The key input device 22 includes a numeric keypad 22T, a up key 22a, a down key 22b, a left direction key 22c, a right direction key 22d, a center key 22e, a power/call-ending key 22f, a dial key 22g and a lock key 22h, each key being a push switch. Furthermore, on an upper top surface of the case C, the LCD monitor 26 is arranged, and on a top surface of the LCD monitor 26, the touch panel 32 is arranged. An operation of pushing each key by the user is hereinafter referred to as a "key input", and an operation of pushing, stroking, drawing the top surface of the touch panel 32 with a finger, a pen, or the like is referred to as a "touch input".

In addition, in the vicinity of the upper end of the top surface of the case C, an opening OP1 leading to the speaker 42 although not shown in FIG. 2 is provided, and in the vicinity of the lower end of the top surface of the case C, an opening OP2 leading to the microphone 40 although not shown in FIG. 2 as well is provided. Accordingly, the user listens to a sound output from the speaker 42 through the opening OP1, and inputs his or her voice to the microphone 42 through the opening OP2. In the vicinity of a lower left of the LCD monitor 26 on the top surface of the case C, an opening OP3 is provided, and a sensor portion of the photosensor 38 is exposed from the opening of an open end of the opening OP3. It should be noted that although not illustrated in FIG. 2, on a left side surface of the case C, the earphone jack 44 for being connected with the terminal of the earphone is provided.

In the mobile phone apparatus 10 of such a first embodiment, in correspondence with the state of the mobile phone apparatus 10 detected by the processor 12, a state of the touch panel 32 as an external sensor is switched between the active state and the standby state to thereby conserve electricity, so that it is possible to suppress the electric power consumption of the battery 16.

As shown in FIG. 3, as a state of the external sensor, there are a "first state" in which the touch panel 32 is the active state, and a "second state" in which the touch panel 32 is the standby state.

Furthermore, as shown in FIG. 4, as a state of the mobile phone apparatus 10, there are a low-battery state in which the remaining amount of the battery 16 is less than a predetermined amount, a state in which nothing is displayed on the LCD monitor 26 (non-display), a state in which the touch panel 32 is locked, a state (first condition (condition 1)) in which a phone call is in progress and there is no possibility that a "function operation other than a phone call" is made (only the phone call), a state (second condition (condition 2)) in which a phone call is in progress, but there is a possibility that a "function operation other than a phone call" is made on the basis of the fact that the terminal of the earphone is being connected to the earphone jack 44, a handsfree function is being executed, a conversation is being hold, etc., a state (third condition (condition 3)) in which a phone call is not in progress and an application that is compatible with a "touch input" is being executed, a state (fourth condition (condition 4)) in which a phone call is not in progress and an application that is not compatible with a "touch input" is being executed, and other state.

Here, in a case that the remaining amount of the battery 16 is represented by a gage being made up of a scale of three levels, the low-battery state is the lowest remaining battery power represented by one mark. Furthermore, the touch panel 32 can be locked by performing a "key input" with a long-push of the lock key 22h. While the touch panel 32 is locked, the touch panel controlling IC 30 does not accept a "touch input". Then, the handsfree function can be executed by performing a "key input" with a long-push of the dial key 22g at a time of an incoming call, at a time of an outgoing call, or during a conversation. In addition, the holding function can be executed by performing a "key input" with the power/call-ending key at a time of an incoming call. Additionally, the "function operation other than a phone call" is a character input operation and a still image displaying operation on a Web screen, etc. and a terrestrial digital broadcast displaying operation accompanying a data broadcasting output, for example.

Referring to FIG. 4, in the low-battery state, for the purpose of preventing the power of the battery 16 from being consumed, the touch panel 32 is set to the standby state (second state). In the non-display state of the LCD monitor 26, there is no need to prepare for a "touch input", and therefore, the touch panel 32 is set to the standby state (second state). Furthermore, in a state in which the touch panel 32 is locked, a "touch input" is not accepted, and therefore, the touch panel 32 is set to the standby state (second state).

In the state (first condition) in which a phone call is in progress and there is no possibility that a "function operation other than a phone call" is made (only the phone call), there is no possibility a "touch input" being performed, and therefore, the touch panel 32 is set to the standby state (second state). On the other hand, in the state (second condition) in which a phone call is in progress, but there is a possibility that a "function operation other than a phone call" is made, the touch panel 32 is set to the active state (first state) in preparation for a "touch input".

Moreover, in the state (third condition) in which a phone call is not in progress and an application that is compatible with the "touch input" is being activated, the touch panel 32 is set to the active state (first state) in preparation for a "touch input". On the other hand, in the state (fourth condition) in which a phone call is not in progress and an application that is not compatible with the "touch input" is being executed, there is no possibility that a "touch input" is performed, and therefore, the touch panel 32 is set to the standby state (second state). Then, in the state other than the above description of the mobile phone apparatus 10, the touch panel 32 is set to the active state (first state) in preparation for a "touch input".

Figure 5:
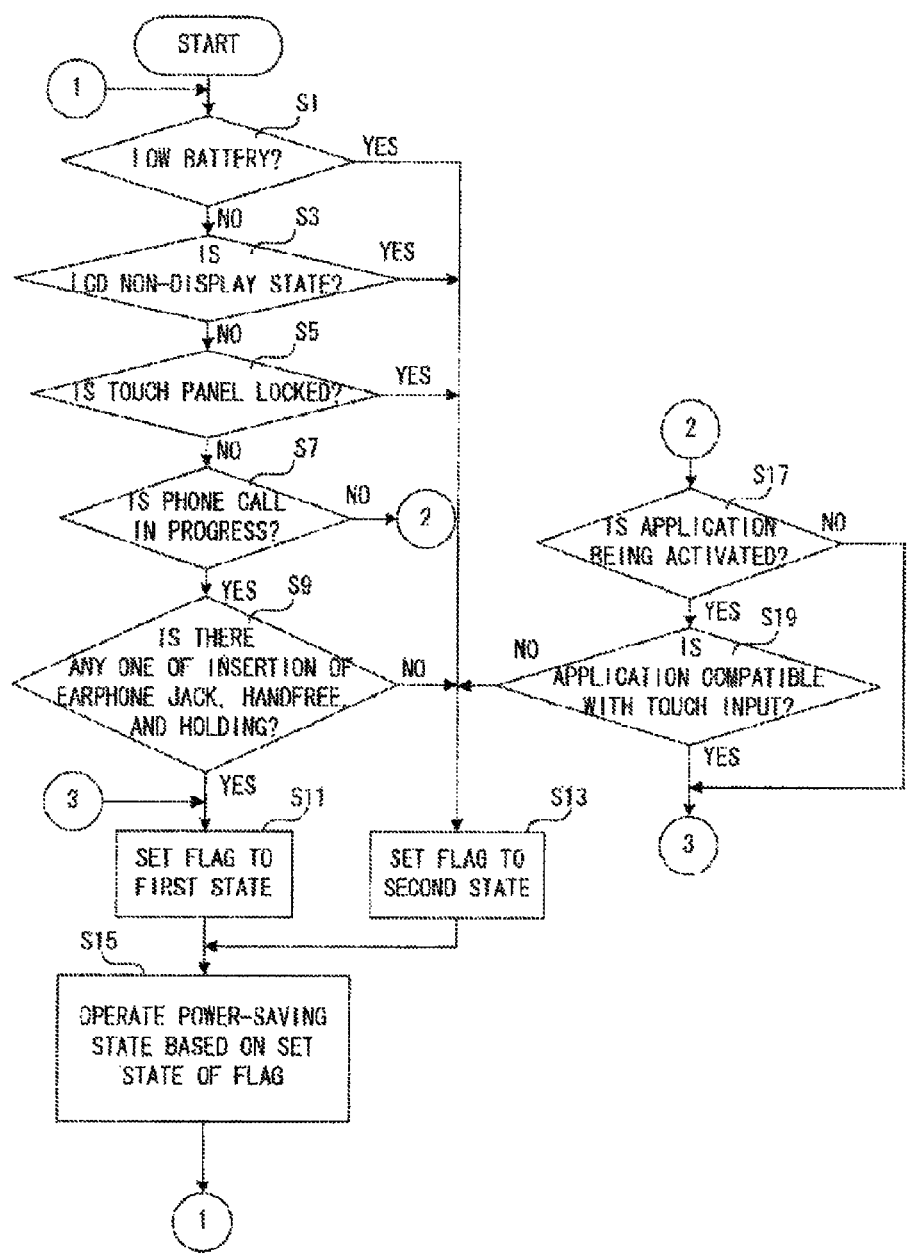
FIG. 5 is a flowchart explaining processing when the processor 12 switches a touch panel 32 between an active state and a standby state in the mobile phone apparatus 10 as one embodiment of the first invention.

Next, with reference to a flowchart in FIG. 5, a processing when the processor 12 switches the touch panel 32 between the active state and the standby state to thereby operate a power-saving state is explained. Here, the processor 12 executes the following processing on the basis of the predetermined program stored in the flash memory 20.

Furthermore, the processor 12 can detect the state of the mobile phone apparatus 10, such as a remaining amount of the battery 16, the presence or absence of a connection of an earphone to the earphone jack 44, and a function corresponding to an activating application according to the well-known techniques. For example, whether or not the activating application is compatible with a predetermined function can be determined by holding a table in which each application name is brought into correspondence with a function name corresponding to this application in the flash memory 20, and by referring the table by the processor 12 when the application is being activated. Alternatively, the processor 12 directly inquires of the activating application whether or not it is compatible with a predetermined function, and this application may respond thereto.

It should be noted that the process shown in the flowchart in FIG. 5 is an example, and the order of the processing is not restricted to that shown in the flowchart, and may be changed as necessary if the present invention can be implemented even after the order of the processing is changed.

Referring to FIG. 5, the processor 12 first determines whether or not the remaining amount of the battery 16 is less than a predetermined amount (low battery) in a step S1. If "YES" is determined in the step S1, the processor 12 sets a flag F to a content indicating the "second state" in a step S13. Here, the flag F is a storage area of a register R, etc.

belonging to the processor 12, for example. The register R (flag F) is set to a "00000001" or a "00000010" to thereby indicate the "first state" or the "second state". The "first state" is a state in which the "00000001" is stored in the register R, and the touch panel 32 is active as shown in FIG. 3. On the other hand, the "second state" is a state in which the "00000010" is stored in the register, and the touch panel 32 is standby as shown in FIG. 3. Accordingly, in the step S13, the "00000010" is stored in the register R (flag F).

When the flag F is thus set, the processor 12 operates the power-saving state on the basis of the set state of the flag F in a step S15. More specifically, since the flag F indicates the "second state", the processor 12 transmits a standby signal to the touch panel controlling IC 30. Here, the touch panel controlling IC 30 that receives the standby signal shuts down the electric power supply from the battery 16 to the touch panel 32 to thereby set the touch panel 32 to the standby state, and the touch panel controlling IC 30 itself becomes the standby state. After the step 15, the process returns to the step S1.

On the other hand, if "NO" is determined in the step S1, the process proceeds to a step S3 to determine whether or not the LCD monitor 26 is in a non-displayed state. If "YES" is determined in the step S3, the "00000010" is stored in the register R to set the flag F to the content indicating the "second state" in the step S13, and further in the step S15, the power-saving state is operated on the basis of the set state of the flag F. More specifically, since the flag F indicates the "second state", the processor 12 transmits the standby signal to the touch panel controlling IC 30.

On the other hand, if "NO" is determined in the step S3, it is determined whether or not the touch panel 32 is locked in a step S5. If "YES" is determined in the step S5, the "00000010" is stored in the register R to set the flag F to the content indicating the "second state" in the step S13, and further in the step S15, the power-saving state is operated on the basis of the set state of the flag F. More specifically, since the flag F indicates the "second state", the processor 12 transmits the standby signal to the touch panel controlling IC 30.

On the other hand, if "NO" is determined in the step S5, it is determined whether or not a phone call is in progress in a step S7. If "YES" is determined in the step S7, it is determined whether or not any one of inserting the terminal of the earphone into the earphone jack 44, a handsfree function, and a holding function is being executed, that is, whether a state in which there is a possibility of the "function operation other than a phone call" being performed during a phone call or not in a next step S9. Even during the phone call, if the terminal of the earphone is inserted into the earphone jack 44, if the handsfree function is executed, or if the holding function is executed, the opening OP1 and the LCD monitor 26 of the mobile phone apparatus 10 are separated from the vicinity of the ear, and this causes a state in which the user performs any operation on the mobile phone apparatus 10 to perform the "function operation other than a phone call". If "YES" is determined in the step S9, "00000001" is stored in the register R to set the flag F to a content indicating the "first state" in a step S11, and further in the step S15, the power-saving state is operated on the basis of the set state of the flag F. More specifically, since the flag F indicates the "first state", the processor 12 transmits the active signal to the touch panel controlling IC 30. Here, the touch panel controlling IC 30 that receives the active signal supplies the electric power from the battery 16 to the touch panel 32 to set it to the active state, and the touch panel controlling IC 30 itself also becomes the active state.

On the other hand, if "NO" is determined in the step S9, the "00000010" is stored in the register R to set the flag F to the content indicating the "second state" in the step S13, and further in the step S15, the power-saving state is operated on the basis of the set state of the flag F. More specifically, since the flag F indicates the "second state", the processor 12 transmits the standby signal to the touch panel controlling IC 30.

If the process returns to the step S7 to determine that the phone call is in progress ("NO" in the step S7), it is determined whether or not the application is being activated in a step S17. If "YES" is determined in the step S17, the processor 12 determines whether or not the application which is being activated is compatible with the "touch input" in a step S19. If "YES" is determined in the step S19, "00000001" is stored in the register R to set the flag F to the content indicating the "first state" in the step S11, and further in the step S15, the power-saving state is operated on the basis of the set state of the flag F. More specifically, since the flag F indicates the "first state", the processor 12 transmits the active signal to the touch panel controlling IC 30.

On the other hand, if "NO" is determined in the step S19, the "00000010" is stored in the register R to set the flag F to the content indicating the "second state" in the step S13, and further in the step S15, the power-saving state is operated on the basis of the set state of the flag F. More specifically, since the flag F indicates the "second state", the processor 12 transmits the standby signal to the touch panel controlling IC 30.

Returning to the step S17, when it is determined that the application is not being activated ("NO" in the step S17), that is, if in other state, "00000001" is stored in the register R to set the flag F to the content indicating the "first state" in the step S11, and further in the step S15, the power-saving state is operated on the basis of the set state of the flag F. More specifically, since the flag F indicates the "first state", the processor 12 transmits the active signal to the touch panel controlling IC 30.

As understood from the above description, the mobile phone apparatus 10 of the first embodiment determines whether or not the touch panel 32 being an external sensor has to be operated depending on the operating state of the mobile phone apparatus 10, and switches the touch panel 32 from the active state to the standby state if the touch panel 32 is not required to be operated. Accordingly, it is possible to prevent the touch panel 32 from being supplied with useless electric power, and reduce the electric power consumption of the battery 16.

Second Embodiment

In the second embodiment, the configuration of the mobile phone apparatus 10 in FIG. 1 and the appearance of the mobile phone apparatus 10 shown in FIG. 2 that are used for explanation of the first embodiment are common, and therefore, in the explanation of the second embodiment, drawings and explanations therefor are omitted.

In the second embodiment, when receiving the active signal from the processor 12, the sensor controlling IC 34 supplies an electric power from the power source IC 14 to the acceleration sensor 36 to thereby set the acceleration sensor 36 to the active state. On the other hand, when receiving the standby signal from the processor 12, the acceleration sensor controlling IC 34 shuts down the electric power from the power source IC 14 to the acceleration sensor 36 to thereby set the acceleration sensor 36 to the standby state. Furthermore, when receiving the standby signal, the acceleration sensor controlling IC 34 shuts down the electric power to the part that is not used during the standby of the acceleration sensor 34 out of the acceleration sensor controlling IC 34, and the acceleration sensor controlling IC 34 itself becomes the standby state.

Accordingly, in the mobile phone apparatus 10 of the second embodiment, the processor 12 individually transmits the active signal or the standby signal to the acceleration sensor controlling IC 34 as well as the touch panel controlling IC 30.

In such a mobile phone apparatus 10 of the second embodiment, depending on the state of the mobile phone apparatus 10, each of the states of the touch panel 32 and the acceleration sensor 36 as external sensors is switched between the active state and the standby state to thereby conserve electricity, capable of suppressing the electric power consumption of the battery 16.

As shown in FIG. 6, as combinations of the states of the external sensors, there are a "first state" in which both of the touch panel 32 and the acceleration sensor 36 are the active state, a "second state" in which the touch panel 32 is the active state, and the acceleration sensor 36 is the standby state, a "third state" in which the touch panel 32 is the standby state, and the acceleration sensor 36 is the active state, and a "fourth state" in which both of the touch panel 32 and the acceleration sensor 36 are the standby state.

Furthermore, as a state of the mobile phone apparatus 10, as shown in FIG. 7, there are a low-battery state in which the remaining amount of the battery 16 is less than a predetermined amount, a state in which nothing is displayed on the LCD monitor 26 (non-display), a state in which the touch panel 32 is locked, a state (fifth condition (condition5)) in which a phone call is in progress and there is no possibility that a "function operation other than a phone call" is made, a state (sixth condition (condition 6)) in which a phone call is in progress, but there is a possibility that a "function operation other than a phone call" is made on the basis of the fact that the terminal of the earphone is being connected to the earphone jack 44, a handsfree function is being executed, a conversation is being hold, etc., a state (seventh condition (condition 7)) in which a phone call is not in progress and an application that is compatible with the "touch input" and "the rotative display" is being executed, a state (eighth condition (condition 8)) in which a phone call is not in progress and an application that is compatible with the "touch input" and is not compatible with "the rotative display" is being executed, a state (ninth condition (condition 9)) in which a phone call is not in progress and an application that is not compatible with the "touch input" and is compatible with "the rotative display" is being executed, a state (tenth condition (condition 10)) in which a phone call is not in progress and an application that is not compatible with the "touch input" and the "rotative display" is being executed, and other state. Here, the "rotative display" is determining the up and down directions of the LCD monitor 36 by the function of the acceleration sensor 36 and displaying a display object, such as an still image in a rotated manner so as to conform to the up and down directions as described above.

Referring to FIG. 7, in the low-battery state, for the purpose of preventing the power of the battery 16 from being consumed, both of the touch panel 32 and the acceleration sensor 36 are set to the standby state (fourth state). In the non-display state of the LCD monitor 26, there is no possibility of a "touch input", and a display object displayed on the LCD monitor 26 need not undergo the "rotative display", and therefore, both of the touch panel 32 and the acceleration sensor 36 are set to the standby state (fourth state). Then, in the state in which the touch panel 32 is locked, a "touch input" is not accepted, and therefore, the touch panel 32 is set to the standby state, but an object is displayed on the LCD monitor 26, and there is a possibility that the display object undergoes the "rotative display", and therefore, the acceleration sensor 36 is set to the active state (third state).

In the state (fifth condition) in which a phone call is in progress and there is no possibility that a "function operation other than a phone call" is made, there is no possibility of a "touch input" and there is no possibility that the display object displayed on the LCD monitor 26 undergoes the "rotative display", and therefore, both of the touch panel 32 and the acceleration sensor 36 are set to the standby state (fourth state). On the other hand, in the state (sixth condition) in which a phone call is in progress, but there is a possibility that a "function operation other than a phone call" is made, in preparation for a "touch input" being performed, the touch panel 32 is set to the active state, and the "rotative display" is not performed according to the specifications (specs), and therefore, the acceleration sensor 36 is set to the standby state (second state).

In the state (seventh condition) in which a phone call is not in progress and an application that is compatible with the "touch input" and the "rotative display" is being activated, the touch panel 32 is set to the active state in preparation for the "touch input", and the acceleration sensor 36 is set to the active state (first state) in preparation for the "rotative display". Furthermore, in the state (eighth condition) in which a phone call is not in progress and an application that is compatible with the "touch input" and is not compatible with "the rotative display" is being activated, the touch panel 32 is set to the active state in preparation for the "touch input", and the acceleration sensor 36 is set to the standby state (second state) because there is no need to prepare for the "rotative display". In addition, in the state (ninth condition) in which a phone call is not in progress and an application that is not compatible with the "touch input" and is compatible with "the rotative display" is being activated, the touch panel 32 is set to the standby state because there is no need to prepare for the "touch input", and the acceleration sensor 36 is set to the active state (third state)" in preparation for the "rotative display". In the state (tenth condition) in which a phone call is not in progress and an application that is not compatible with the "touch input" and the "rotative display" is being executed, there is no need to prepare for the "touch input" and the "rotative display", and therefore, both of the touch panel 32 and the acceleration sensor 36 are set to the standby state (fourth state). Then, in the state other than the above description of the mobile phone apparatus 10, both of the touch panel 32 and the acceleration sensor 36 are set to the active state in preparation for the "touch input" and the "rotative display" (first state).

Figure 9:
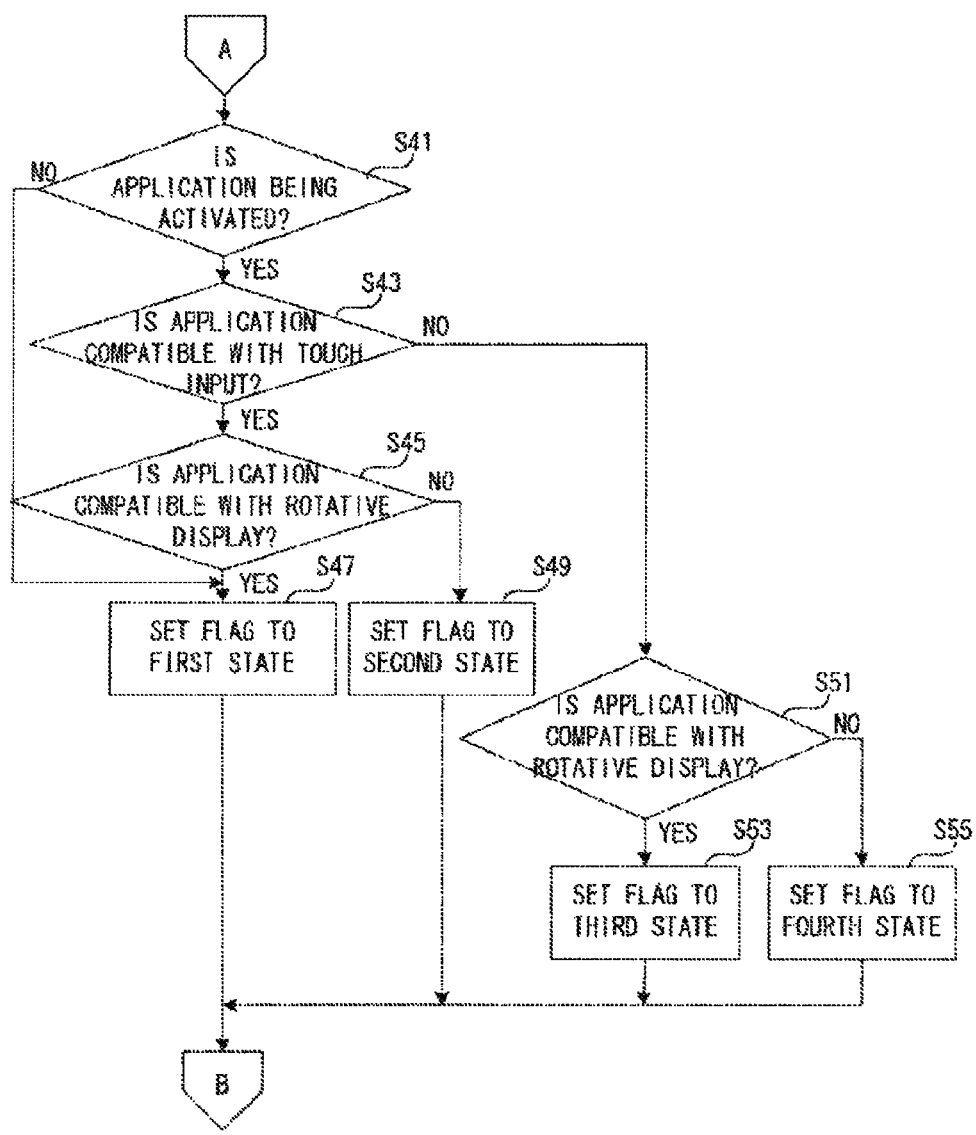
FIG. 9 is a flowchart sequel to the flowchart in FIG. 8.

Next, with reference to flowcharts in FIG. 8 and FIG. 9, processing when the processor 12 operates the power-saving state by switching the touch panel 32 and the acceleration sensor 36 between the active state and the standby state is explained. Here, the processor 12 executes the following processing on the basis of the predetermined program stored in the flash memory 20. Furthermore, the processor 12 can detect the state of the mobile phone apparatus 10, such as a remaining amount of the battery 16, the presence or absence of a connection of an earphone to the earphone jack 44, and a function corresponding to an activating application according to the well-known techniques. It should be noted that the processing shown in the flowcharts in FIG. 8 and FIG. 9 is an example, and the order of the processing is not restricted to that shown in the flowcharts, and may be changed as necessary if the present invention can be implemented even after the order of the processing is changed.

Referring to FIG. 8, the processor 12 determines whether or not the remaining amount of the battery 16 is less than a predetermined amount (low battery) in a step S21. If "YES" is determined in the step S21, the processor 12 sets the flag F to the "fourth state" in a step S37. The flag F, here, is a storage area of a register R, etc. belonging to the processor 12. The register R (flag F) indicates any one of the "first state" to the "fourth state" by being set to any one of a "00000001", a "00000010", a "00000100", and a "00001000". The "first state" is a state in which the "00000001" is stored in the register R, and both of the touch panel 32 and the acceleration sensor 36 are active as shown in FIG. 6. The "second state" is a state in which the "00000010" is stored in the register and the touch panel 32 is active, and the acceleration sensor 36 is standby as shown in FIG. 6. This holds true for the following. That is, the states in which the "00000100" and the "00001000" are stored in the register R (flag F) respectively indicate the "third state" and the "fourth state". Accordingly, in the step S37, the "00001000" is stored in the register R (flag F).

When the flag F is thus set, in a step S35, the processor 12 operates the power-saving state on the basis of the set state of the flag F. More specifically, since the flag F indicates the "fourth state", the processor 12 transmits the standby signal to both of the touch panel controlling IC 30 and the acceleration sensor controlling IC 34.

On the other hand, if "NO" is determined in the step S21, the process proceeds to a step S23 to determine whether or not the LCD monitor 26 is a non-display state. If "YES" is determined in the step S23, the "00001000" is stored in the register R to set the flag F to the content indicating the "fourth state" in the step S37, and further in the step S35, the power-saving state is operated on the basis of the set state of the flag F. More specifically, since the flag F indicates the "fourth state", the processor 12 transmits the standby signal to both of the touch panel controlling IC 30 and the acceleration sensor controlling IC 34.

On the other hand, if "NO" is determined in the step S23, it is determined whether or not the touch panel 32 is locked in a step S25. If "YES" is determined in the step S25, "00000100" is stored in the register R to set the flag F to a content indicating the "third state" in a step S39, and further in the step S35, the power-saving state is operated on the basis of the set state of the flag F. More specifically, since the flag F indicates the "third state", the processor 12 transmits the standby signal to the touch panel controlling IC 30, and transmits the active signal to the acceleration sensor controlling IC 34.

On the other hand, if "NO" is determined in the step S25, it is determined whether or not a phone call is being made in a step S27. If "YES" is determined in the step S27, it is determined whether or not any one of inserting the terminal of the earphone into the earphone jack 44, a handsfree function, and a holding function is being executed, that is, whether a state in which there is a possibility of the "function operation other than a phone call" being performed during a phone call or not in a step S29. If "YES" is determined in the step S29, the "00000010" is stored in the register R to set the flag F to a content indicating a "second state" in a step S31, and further in the step S35, the power-saving state is operated on the basis of the set state of the flag F. More specifically, since the flag F indicates the "second state", the processor 12 transmits the active signal to the touch panel controlling IC 30 and the standby signal to the acceleration sensor controlling IC 34. On the other hand, if "NO" is determined in the step 29, the "00001000" is stored in the register R to set the flag F to a content indicating the "fourth state" in a step S33, and further in the step S35, the power-saving state is operated on the basis of the set state of the flag F. More specifically, since the flag F indicates the "fourth state", the processor 12 transmits the standby signal to both of the touch panel controlling IC 30 and the acceleration sensor controlling IC 34.

Returning to the step S27, when it is determined that a phone call is not being made ("NO" in the step S27), it is determined whether or not an application is being activated in a step S41. If "YES" is determined in the step S41, the application which is being activated is compatible with the "touch input" in a step S43. If "YES" is determined in the step S43, it is determined whether or not the application which is being activated is compatible with the "rotative display" in a step S45. If "YES" is determined in the step S45, the "00000001" is stored in the register R to set the flag F to a content indicating the "first state" in a step S47, and further in the step S35, the power-saving state is operated on the basis of the set state of the flag F. More specifically, since the flag F indicates the "first state", the processor 12 transmits the active signal to both of the touch panel controlling IC 30 and the acceleration sensor controlling IC 34.

On the other hand, if "NO" is determined in the step S45, the "00000010" is stored in the register R to set the flag F to the content indicating the "second state" in a step S49, and further in the step S35, the power-saving state is operated on the basis of the set state of the flag F. More specifically, since the flag F indicates the "second state", the processor 12 transmits the active signal to the touch panel controlling IC 30 and transmits the standby signal to the acceleration sensor IC 34.

Returning to the step S43, when it is determined that the application which is being activated is not compatible with the "touch input" ("NO" in the step S43), it is then determined whether or not the application which is being activated is compatible with the "rotative display" in a step S51. If "YES" is determined in the step S51, the "00000100" is stored in the register R to set the flag F to the content indicating the "third state in a step S53, and further in the step S35, the power-saving state is operated on the basis of the set state of the flag F. More specifically, since the flag F indicates the "third state", the processor 12 transmits the standby signal to the touch panel controlling IC 30, and transmits the active signal to the acceleration sensor controlling IC 34.

On the other hand, if "NO" is determined in the step S51, the "00001000" is stored in the register R to set the flag F to the content indicating the "fourth state" in a step S55, and further in the step S35, the power-saving state is operated on the basis of the set state of the flag F. More specifically, since the flag F indicates the "fourth state", the processor 12 transmits the standby signal to both of the touch panel controlling IC 30 and the acceleration sensor controlling IC 34.

Returning to the step S41, when it is determined that the application is not being activated ("NO" in the step S41), that is, if in other state, the "00000001" is stored in the register R to set the flag F to a content indicating the "first state" in a step S47, and further in a step S79, the power-saving state is operated on the basis of the set state of the flag F. More specifically, since the flag F indicates the "first state", the processor 12 transmits the active signal to both of the touch panel controlling IC 30 and the acceleration sensor controlling IC 34.

As understood from the above description, the mobile phone apparatus 10 of the second embodiment determines whether or not the touch panel 32 and the acceleration sensor 36 being external sensors have to be operated depending on the operating state of the mobile phone apparatus 10, and switches each of the touch panel 32 and the acceleration sensor 36 from the active state to the standby state in a case that there is no need for operation. Accordingly, it is possible to prevent the touch panel 32 and the acceleration sensor 36 from being supplied with useless electric power, and reduce the electric power consumption of the battery 16.

Third Embodiment

In the third embodiment, the configuration of the mobile phone apparatus 10 in FIG. 1 and the appearance of the mobile phone apparatus 10 shown in FIG. 2 that are used for explanation of the first embodiment are common, and therefore, in the explanation of the third embodiment, drawings and explanations therefor are omitted.

In the third embodiment, when receiving the active signal from the processor 12, the acceleration sensor controlling IC 34 supplies an electric power from the power source IC 14 to the acceleration sensor 36 to thereby set the acceleration sensor 36 to the active state. On the other hand, when receiving a standby signal from the processor 12, the acceleration sensor controlling IC 34 shuts down the electric power from the power source IC 14 to the acceleration sensor 36 to thereby set the acceleration sensor 36 to the standby state. Furthermore, when receiving the standby signal, the acceleration sensor controlling IC 34 shuts down the electric power to the part that is not used during the standby state of the acceleration sensor 36 out of its own circuit 34, and the acceleration sensor controlling IC 34 itself becomes the standby state.

Then, in the mobile phone apparatus 10 of the third embodiment, the processor 12 switches the electric power from the battery 16 to be supplied to the photosensor 38 via the power source IC 14 and the processor 12 between the ON and OFF states in addition to individually transmit the active signal or the standby signal to the acceleration sensor controlling IC 34 as well as the touch panel controlling IC 30.

In the mobile phone apparatus 10 of such a third embodiment, depending on the states of the mobile phone apparatus 10, each of the states of the touch panel 32 and the acceleration sensor 36 as external sensors is switched between the active state and the standby state, and moreover, the electric power supplied to the photosensor 38 as an external sensor is switched between the ON and OFF states to thereby save the electricity, capable of suppressing the electric power consumption of the battery 16.

As shown in FIG. 10, as combinations of the external sensors, a "first state" in which both of the touch panel 32 and the acceleration sensor 36 are in the active state, and the electric power supply to the photosensor 38 is the "ON state", a "second state" in which the touch panel 32 is the active state, the acceleration sensor 36 is the standby state, and the electric power supply to the photosensor 38 is the "ON state", a "third state" in which the touch panel 32 is the active state, the acceleration sensor 36 is the standby state, and the electric power supply to the photosensor 38 is the "OFF state", a "fourth state" in which the touch panel 32 is the standby state, the photosensor 38 is the active state, and the electric power supply to the photosensor 38 is the "ON state", a "fifth state" in which both of the touch panel 32 and the acceleration sensor 36 are the standby state, and the electric power supply to the photosensor 38 is the "ON state", and a "sixth state" in which both of the touch panel 32 and the acceleration sensor 36 are the standby state, and the electric power supply to the photosensor 38 is the "OFF state".

Furthermore, as shown in FIG. 11, as states of the mobile phone apparatus 10, there are a low-battery state in which the remaining amount of the battery 16 is less than a predetermined amount, a state in which nothing is displayed on the LCD monitor 26 (non-display), a state in which the touch panel 32 is locked, a state (eleventh condition (condition 11)) in which a phone call is in progress and there is no possibility that a "function operation other than a phone call" is made, a state (twelfth condition (condition 12)) in which a phone call is in progress, there is a possibility that a "function operation other than a phone call" is made, and a "function operation other than a phone call" is actually performed, a state (thirteenth condition (condition 13)) in which a phone call is in progress, there is a possibility that a "function operation other than a phone call" is made, and a "function operation other than a phone call" is not actually performed, a state (fourteenth condition (condition 14)) in which a phone call is not in progress and an application that is compatible with the "touch input" and "the rotative display" is being executed, a state (fifteenth condition (condition 15)) in which a phone call is not in progress and an application that is compatible with the "touch input" and is not compatible with the "rotative display" is being executed, a state (sixteenth condition (condition 16)) in which a phone call is not in progress and an application that is not compatible with the "touch input" and is compatible with "the rotative display" is being executed, a state (seventeenth condition (condition 17)) in which a phone call is not in progress and an application that is not compatible with the "touch input" and the "rotative display" is being executed, and other state.

Referring to FIG. 11, in the low-battery state, for the purpose of preventing the power of the battery 16 from being consumed, both of the touch panel 32 and the acceleration sensor 36 are set to the standby state, and the electric power supply to the photosensor 38 is set to the "OFF state" (sixth state). In the non-display state of the LCD monitor 26, there is no possibility of a "touch input" being made, and therefore, the touch panel 32 is set to the standby state, the display object of the LCD monitor 26 need not undergo the "rotative display", and therefore, the acceleration sensor 36 is also set to the standby state, and the brightness of the LCD monitor 26 (backlight 28) need not be adjusted, and therefore, the electric power supply to the photosensor 38 is set to the "OFF state" (sixth state). Furthermore, in the state in which the touch panel 32 is locked, a "touch input" is not accepted, and therefore, the touch panel 32 is set to the standby state, but there is a possibility that a display object that undergoes the "rotative display" is displayed on the LCD monitor 26, and therefore, the acceleration sensor 36 is set to the active state, and the brightness of the display of the LCD monitor 26 need to be adjusted, and therefore, the electric power supply to the photosensor 38 is set to the "ON state" (fourth state).

In the state (eleventh condition) in which a phone call is in progress and there is no possibility that a "function operation other than a phone call" is made, there is no possibility of a "touch input" being made, and therefore, the touch panel 32 is set to the standby state, the display object that undergoes the "rotative display" is never displayed on the LCD monitor 26, and therefore, the acceleration sensor 36 is also set to the standby state, and the brightness of the display of the LCD monitor 26 need not be adjusted, and therefore, the electric power supply to the photosensor 38 is set to the "OFF state" (sixth state). In addition, in the state (twelfth condition) in which a phone call is in progress, there is a possibility that a "function operation other than a phone call" is made, and a "function operation other than a phone call" is actually performed, the touch panel 32 is set to the active state in preparation for a "touch input", the "rotative display" is not performed according to the specifications, and therefore the acceleration sensor 36 is set to the standby state, and the brightness of the display of the LCD monitor 26 need to be adjusted, and therefore, the electric power supply to the photosensor 38 is set to the "ON state" (second state). Then, in the state (thirteenth condition) in which a phone call is in progress, there is a possibility that a "function operation other than a phone call" is made, and a "function operation other than a phone call" is not actually performed, the touch panel 32 is set to the active state in preparation for a "touch input", the "rotative display" is not performed according to the specifications (specs), and therefore the acceleration sensor 36 is set to the standby state, and the brightness of the display of the LCD monitor 26 need not to be adjusted, and therefore, the electric power supply to the photosensor 38 is set to the "OFF state" (third state).

Furthermore, in the state (fourteenth condition) in which a phone call is not in progress and an application that is compatible with the "touch input" and "the rotative display" is being activated, the touch panel 32 is set to the active state in preparation for a "touch input", the acceleration sensor 36 is also set to the active state in preparation for a "rotative display", and the brightness of the display of the LCD monitor 26 need to be adjusted, and therefore, the electric power supply to the photosensor 38 is set to the "ON state" (first state). In addition, in the state (fifteenth condition) in which a phone call is not in progress, an application that is compatible with the "touch input" and is not compatible with the "rotative display" is being activated, the touch panel 32 is set to the active state in preparation for a "touch input", there is no need to prepare for a "rotative display", and therefore, the acceleration sensor 36 is set to the standby state, and the brightness of the display of the LCD monitor 26 need to be adjusted, and therefore, the electric power supply to the photosensor 38 is set to the "ON state" (second state). Then, in the state (sixteenth condition) in which a phone call is not in progress and an application that is not compatible with the "touch input" and is compatible with "the rotative display" is being executed, there is no need to prepare for a "touch input", and therefore, the touch panel 32 is set to the standby state, there is a need to prepare for the "rotative display", and therefore, the acceleration sensor 36 is set to the active state, and the brightness of the display of the LCD monitor 26 need to be adjusted, and therefore, the electric power supply to the photosensor 38 is set to the "ON state" (fourth state). In addition, in the state (seventeenth condition) in which a phone call is not in progress and an application that is not compatible with the "touch input" and the "rotative display" is being executed (seventeenth condition), there is no need to prepare for a "touch input", and therefore, the touch panel 32 is set to the standby state, there is no need to prepare for a "rotative display", and therefor, the acceleration sensor 36 is also set to the standby state, and the brightness of the display of the LCD monitor 26 need to be adjusted, and therefore, the electric power supply to the photosensor 38 is set to the "ON state" (fifth state). Then, in the state other than the above-description of the mobile phone apparatus 10, the touch panel 32 is set to the active state in preparation for a "touch input", the acceleration sensor 36 is also set to the active state in preparation for the "rotative display", and for the adjustment of the brightness of the display of the LCD monitor 26, the electric power supply to the photosensor 38 is set to the "ON state" (first state).

Next, with reference to flowcharts in FIG. 12 and FIG. 13, processing when the processor 12 operates a power-saving state by switching the touch panel 32 and the acceleration sensor 36 between the active state and the standby state, and by switching the electric power supply to the photosensor 38 between the ON and OFF states. Here, the processor 12 executes the following processing on the basis of the predetermined program stored in the flash memory 20.

Furthermore, the processor 12 can detect the states of the mobile phone apparatus 10, such as a remaining amount of the battery 16, the presence or absence of a connection of an earphone to the earphone jack 44, and a function corresponding to an activating application according to the well-known techniques.

It should be noted that the processing shown in the flowcharts in FIG. 12 and FIG. 13 is an example, and the order of the processing is not restricted to that shown in the flowcharts, and may be changed as necessary if the present invention can be implemented even after the order of the processing is changed.

With reference to FIG. 12, the processor 12 first determines whether or not the remaining amount of the battery 16 is less than a predetermined amount (low battery) in a step S61. If "YES" is determined in the step S61, the processor 12 sets the flag F to a content indicating the "sixth state" in a step S81. The flag F, here, is a storage area such a register R, etc. belonging to the processor 12. The register R (flag F) stores any one of the "first state" to the "sixth state" by being set to a "00000001", a "00000010", a "00000100", a "00001000", a "00010000", a "00100000". The "first state" is a state in which the "00000001" is stored in the register R, both of the touch panel 32 and the acceleration sensor 36 are active, and the electric power supply to the photosensor 38 is set to the "ON state" as shown in FIG. 10. The "second state" is a state in which the numerical value "00000010" is stored in the register R, the touch panel 32 is active, the acceleration sensor 36 is standby, and the electric power supply to the photosensor 38 is set to the "ON state" as shown in FIG. 10. This holds true for the following. That is, storing the "00000100", the "00001000", the "00010000", and the "00100000" in the register R (flag F) respectively show the "third state", the "fourth state", the "fifth state", and the "sixth state". Accordingly, in the step S81, the "00100000" is stored in the register R (flag F).

When the flag F is thus set, the processor 12 operates a power-saving state on the basis of the set state of the flag F in a step S79. More specifically, since the flag F indicates the "sixth state", the processor 12 transmits the standby signal to both of the touch panel controlling IC 30 and the acceleration sensor controlling IC 34, and sets the electric power supply to the photosensor 38 to the "OFF state".

On the other hand, if "NO" is determined in the step S61, the process proceeds to a step S63 to determine whether or not the LCD monitor 26 is in a non-display state. If "YES" is determined in the step S63, the "00100000" is stored in the register R to set the flag F to the content indicating the "sixth state" in the step S81, and further in the step S79, the power-saving state is operated on the basis of the set state of the flag F. More specifically, since the flag F indicates the "sixth state", the processor 12 transmits the standby signal to both of the touch panel controlling IC 30 and the acceleration sensor controlling IC 34, and sets the electric power supply to the photosensor 38 to the "OFF state".

On the other hand, if "NO" is determined in the step S63, it is determined whether or not the touch panel 32 is locked in a step S65. If "YES" is determined in the step S65, the "00001000" is stored in the register R to set the flag F to a content indicating the "fourth state" in a step S83, and further in the step S79, the power-saving state is operated on the basis of the set state of the flag F. More specifically, since the flag F indicates the "fourth state", the processor 12 transmits the standby signal to the touch panel controlling IC 30, transmits the active signal to the acceleration sensor controlling IC 34, and sets the electric power to the photosensor 38 to the "ON state".

On the other hand, if "NO" is determined in the step S65, it is determined whether or not a phone call is in progress in a step S67. If "YES" is determined in the step S67, in a next step S69, it is determined whether or not any one of inserting the terminal of the earphone into the earphone jack 44, a handsfree function, and a holding function is being executed, that is, whether a state in which there is a possibility of the "function operation other than a phone call" being performed during a phone call or not. If "YES" is determined in the step S69, it is determined whether or not a "function operation other than a phone call" is actually performed in a step S71.

If "YES" is determined in the step 71, the "00000010" is stored in the register R to set the flag F to a content indicating the "second state" in a step S75, and further in the step S79, the power-saving state is operated on the basis of the set state of the flag F. More specifically, since the flag F indicates the "second state", the processor 12 transmits the active signal to the touch panel controlling IC 30, transmits the standby signal to the acceleration sensor controlling IC 34, and sets the electric power supply to the photosensor 38 to the "ON state". If "NO" is determined in the step 71, the "00000100" is stored in the register R to set the flag F to a content indicating the "third state" in a step S73, and further in the step S79, the power-saving state is operated on the basis of the set state of the flag F. More specifically, since the flag F indicates the "third state", the processor 12 transmits the active signal to the touch panel controlling IC 30, transmits the standby signal to the acceleration sensor controlling IC 34, and sets the electric power supply to the photosensor 38 to the OFF state.

Returning to the step S69, if "NO" is determined in the step S69, the "00100000" is stored in the register R to set the flag F to the content indicating the "sixth state" in a step S77, and further in the step S79, the power-saving state is operated on the basis of the set state of the flag F. More specifically, since the flag F indicates the "sixth state", the processor 12 transmits the standby signal to both of the touch panel controlling IC 30 and the acceleration sensor controlling IC 34, and sets the electric power supply to the photosensor 38 to the "OFF state".

Returning to the step S67, when it is determined that phone call is not in progress ("NO" in the step S67), it is determined whether or not an application is being activated in a step S85. If "YES" is determined in the step S85, it is determined whether or not the application which is being activated is compatible with a "touch input" in a next step S87.

If "YES" is determined in the step S87, it is determined whether or not the application which is being activated is compatible with the "rotative display" in a step S89. If "YES" is determined in the step S89, the "00000001" is stored in the register R to thereby set the flag F to a content indicating the "first state" in a step S91, and further in the step S79, the power-saving state is operated on the basis of the set state of the flag F. More specifically, since the flag F indicates the "first state", the processor 12 transmits the active signal to both of the touch panel controlling IC 30 and the sensor controlling IC 34, and sets the electric power supply to the photosensor 38 to the "ON state".

On the other hand, if "NO" is determined in the step S89, the "00000010" is stored in the register R to set the flag F to the content indicating the "second state" in a step S93, and further in the step S79, the power-saving state is operated on the basis of the set state of the flag F. More specifically, since the flag F indicates the "second state", the processor 12 transmits the active signal to the touch panel controlling IC 30, transmits the standby signal to the acceleration sensor IC 34, and sets the electric power supply to the photosensor 38 to the "ON state".

Returning to the step S87, if the application which is being activated is not compatible with the "touch input" ("NO" in the step S87), it is determined whether or not the application which is being activated is compatible with the "rotative display" in a next step 95. If "YES" is determined in the step S95, the "00001000" is stored in the register R to set the flag F to the content indicating the "fourth state" in a step S97, and further in the step S79, the power-saving state is operated on the basis of the set state of the flag F. More specifically, since the flag F indicates the "fourth state", the processor 12 transmits the standby signal to the touch panel controlling IC 30, transmits the active signal to the acceleration sensor IC 34, and sets the electric power supply to the photosensor 38 to the "ON state".

On the other hand, if "NO" is determined in the step S95, the "00010000" is stored in the register R to set the flag F to a content indicating the "fifth state" in a step S99, and further in a step S79, the power-saving state is operated on the basis of the set state of the flag F. More specifically, since the flag F indicates the "fifth state", the processor 12 transmits the standby signal to both of the touch panel controlling IC 30 and the acceleration sensor IC 34, and sets the electric power supply to the photosensor 38 to the "ON" state.

Returning to the step S85, when it is determined that the application is not being activated ("NO" in the step S85), that is, if in other state, the "00000001" is stored in the register R to set the flag F to the content indicating the "first state" in a step S91, and further in the step S79, the power-saving state is operated on the basis of the set state of the flag F. More specifically, since the flag F indicates the "first state", the processor 12 transmits the active signal to both of the touch panel controlling IC 30 and the acceleration sensor controlling IC 34, and sets the electric power supply to the photosensor 38 to the "ON state".

As understood from the above description, the mobile phone apparatus 10 of the third embodiment determines whether or not the touch panel 32, the acceleration sensor 36 and the photosensor 38 being external sensors have to be operated depending on the operating states of the mobile phone apparatus 10, and switches each of the touch panel 32 and the acceleration sensor 36 from the active state to the standby state and switches the electric power supply to the photosensor 38 from the ON state to the OFF state in a case that there is no need for operation. Accordingly, it is possible to prevent the touch panel 32, the acceleration sensor 36, and the photosensor 38 from being supplied with useless electric power, and reduce the electric power consumption of the battery 16.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A mobile terminal, comprising:
  a display;
  a power supply configured to supply a power from a battery;
  a touch panel, the touch panel configured to be supplied with the power from the power supply and detect a touch to the display;
  an earphone connector configured to be connected with an earphone; and
  at least one processor configured to
    switch the touch panel between a first state and a second state, wherein electric power consumption of the battery is suppressed in the second state in comparison to the first state, and,
    when a telephone conversation is started, automatically,
      determine which application, among at least a first application and a second application, is being executed prior to the start of the telephone conversation, wherein the first application is configured to accept touch inputs,
      when the first application is determined to be executed prior to the start of the telephone conversation, set or maintain the touch panel in the first state,
      when the second application, which is different than the first application, is determined to be executed prior to the start of the telephone conversation, set or maintain the touch panel in the second state, and,
      when the earphone is connected to the earphone connector, set or maintain the touch panel in the first state regardless of an application being executed prior to the start of the telephone conversation.

2. A touch panel controlling method in a mobile terminal which includes a power supply configured to supply a power from a battery and an earphone connector configured to be connected with an earphone, the method comprising:
  setting to the touch panel a first state or a second state, wherein in the second state electric power consumption of the battery is suppressed in comparison to the first state; and,
  when a telephone conversation is started, automatically,
    determining which application, among at least a first application and a second application, is being executed prior to the start of the telephone conversation, wherein the first application is configured to accept touch inputs,
    when the first application is determined to be executed prior to the start of the telephone conversation, setting or maintaining the touch panel in the first state,
    when the second application, which is different than the first application, is determined to be executed prior to the start of the telephone conversation, setting or maintaining the touch panel in the second state, and,
    when the earphone is connected to the earphone connector, setting or maintaining the touch panel in the first state regardless of an application being executed prior to the start of the telephone conversation.

* * * * *